Feb. 4, 1941.  J. LOUMIET ET LAVIGNE  2,230,255
METHOD AND APPARATUS FOR PRODUCING INTIMATE CONTACT BETWEEN FLUIDS
Filed July 12, 1933  2 Sheets-Sheet 1
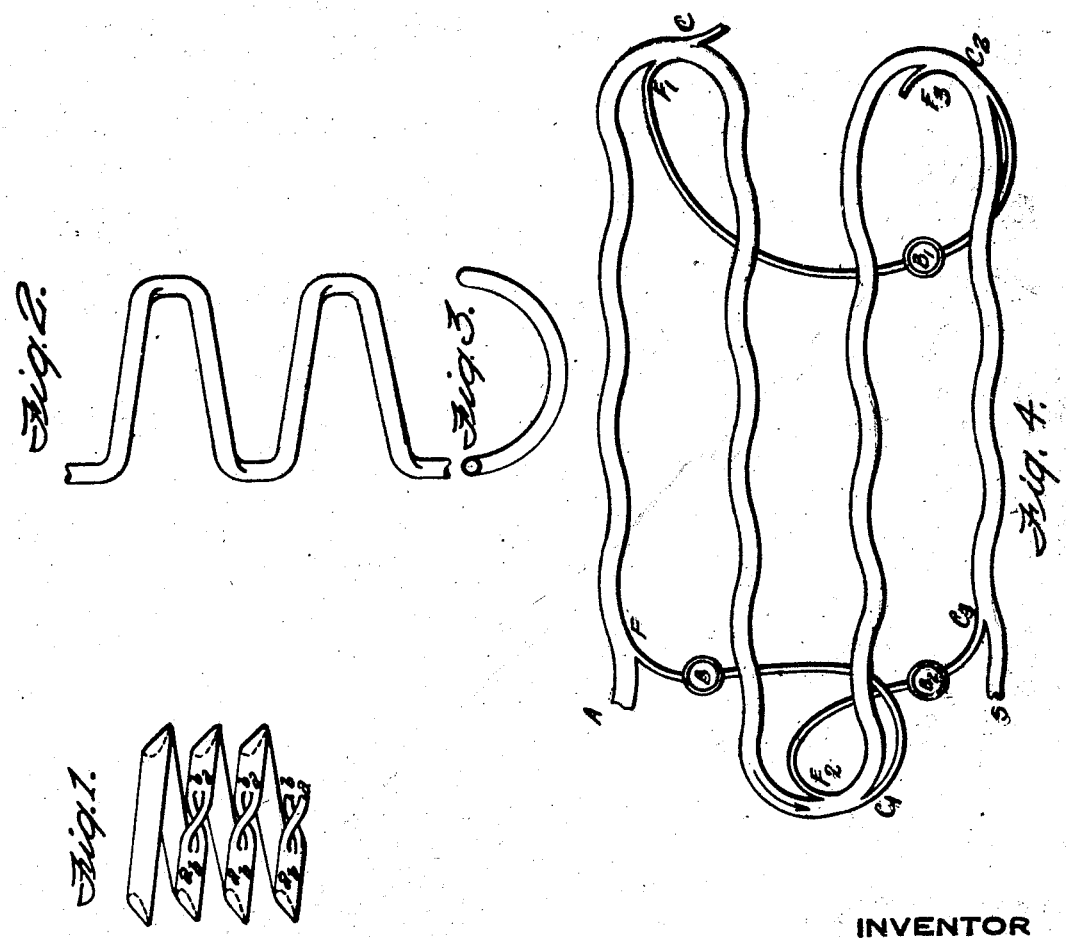
INVENTOR
Jean Loumiet et Lavigne
BY
Moses & Nolte
ATTORNEYS

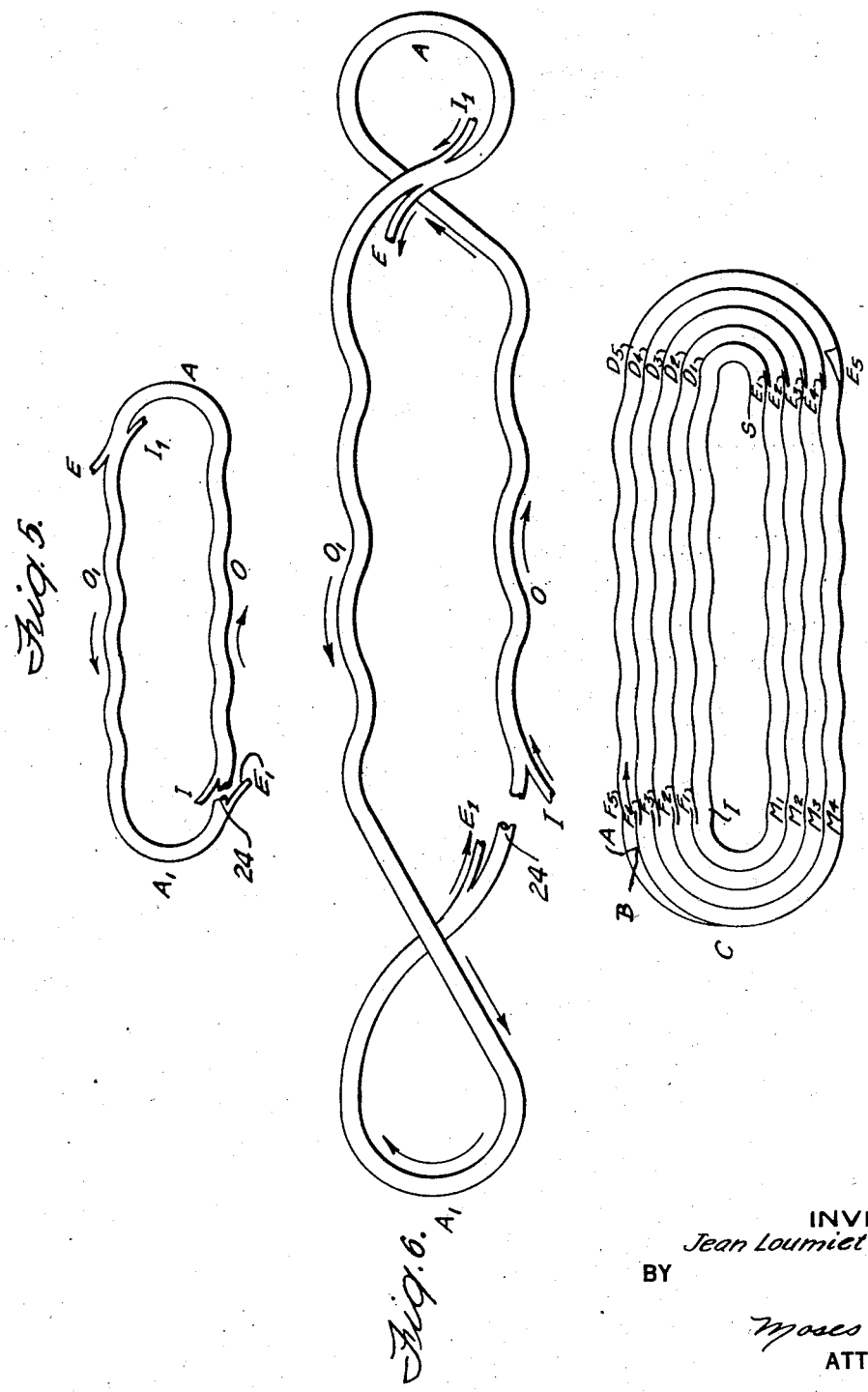

Patented Feb. 4, 1941

2,230,255

UNITED STATES PATENT OFFICE 2,230,255

METHOD AND APPARATUS FOR PRODUCING INTIMATE CONTACT BETWEEN FLUIDS

Jean Loumiet et Lavigne, Itabo, Cuba

Application July 12, 1938, Serial No. 218,756
In Cuba August 2, 1937

8 Claims. (Cl. 231—75)

This invention relates broadly to a means and method for thoroughly and effectively mixing together two or more fluids even though they be not readily miscible, such, for example, as oil and water, or petroleum vapor and water in an atomized state.

An object of the invention is to utilize the centrifugal force of fluids moving along a curved surface to cause an intimate mixing thereof. Subsequently, if a separation of the two fluids is desired after the heat exchange between them has been completed, the centrifugal force of the fluids moving rapidly along a concave surface may be utilized to cause the fluid of greater density to be deposited in the form of small drops or particles along said surface from which it may be withdrawn and utilized.

A still further object of the invention is to utilize the above mentioned principle by providing a conducting conduit for the liquids or fluids whose curvature is reversed at short distances along its length, such as an undulate tube.

Another object is to provide a generally helical pipe with interrupting portions and two members connecting consecutive portions so that one member transfers the fluid from a region near the outer wall of one section to a region near the inner wall of the adjacent section and the second connecting member transfers it from a region near the inner wall of one section to a region near the outer wall of the adjacent section. This causes a crossing of the portions of the fluid or fluids which are of different densities and a thorough mixing thereof.

Other and further objects will become apparent to those skilled in the art as the description thereof proceeds. For a better understanding of the invention, however, reference is made to the following description taken in connection with the accompanying drawings, in which, Fig. 1 represents schematically a generally helical coil embodying the invention;

Figs. 2 and 3 represent in elevation and plan respectively a coil comprising portions of helical shape and connected together;

Fig. 4 represents, in plan, a condenser comprising undulate tubes and embodying this invention;

Figs. 5 to 7 represent in plan portions of rectifying or distilling columns embodying the invention.

This invention is especially adapted to provide a new cooling process and apparatus by which direct contact of the product of distillation of petroleum with water is effected.

Even though this invention has been developed and conceived principally for that application, it constitutes a means for obtaining a contact of substantial duration between two non-miscible fluids of different densities; and has an application not only in the petroleum industry for the cooling or condensation of the distillation products, but also in other industrial operations such as distillation in general, the cooling or the dissolution of gases, the rectification and purification of oils, etc.

The process consists in causing both fluids to circulate at the same time in the same conduit and in provoking frequent changes of the mutual position of both fluids in that conduit, so that when those changes occur they are obliged to cross each other and therefore to come into intimate contact.

The first application consists in causing both fluids to circulate in a spire of a helicoidal coil, where, by reason of centrifugal force, both fluids become situated in different places, namely, the water at the outer part and the oil at the inner part; and in effecting the injection of the oil and the water in that coil in opposite positions, namely, the water in the inner part and the oil in the outer part.

Hence, the centrifugal force compels the exchange of both fluids in relation to their respective positions within the section of the coil; and by reason of that movement those fluids cross each other and come into an intimate contact which causes the interchange of heat between them.

In order to increase the duration of the contact, the injections are effected in the direction of the motion, that is, tangentially to the coil.

The process, when carried out in that form causes, at each injection of fluid, one single contact or one single opportunity for the fluids to cross each other.

Since, generally, in one single contact the exchange of heat will not be sufficient to obtain the desired effect, it will be necessary to repeat the operation in a second spire; to which effect, as represented in Fig. 1 of the drawings, the fluid extracted from the inner part of the first spire through tube *a* is injected at the outer part of the second one, and the fluid extracted from the outer part of the first spire through tube *b* is injected at the inner part of the second one.

This arrangement might be replaced by the employment of a counter-curve within the coil because in the counter-curve the position of the concavity changes. That change of concavity causes a centrifugal force in an opposite direction to that of the first position, and in consequence, the mutual displacement and mixing of the fluids.

In that way, the circulating fluids exchange their respective positions in the section at each change of concavity, crossing each other mutually with the corresponding interchange of heat.

Figs. 2 and 3 of the drawings represent respectively in elevation and plan a coil having curves and counter-curves applicable to the process of cooling by direct contact.

The successive curves change by 180 degrees the direction of the centrifugal force, caused by motion of a fluid at high velocity.

Therefore, the dense fluid tends to place itself, in the successive curves, alternatively at one side of the section of the tube and at the opposite side. The light fluid has at each moment opposite tendencies to those of the dense fluid.

The cooling apparatus for the oil, by direct contact of the oil to be cooled with the cooling water which is injected in them, that have been described, be they coils or tubes, can be made with any shape of section; but it is preferable to elongate that section according to the direction in which the crossing of the fluids is to be produced, or according to the forces acting upon those fluids, giving to the tubes an oval shape.

In the case of the helicoidal coil there act both the centrifugal force and gravity, and the greater dimension of the section must be placed in the approximate direction of the resultant of those forces.

In the case of the undulate tubes, the section must be elongated along the place of the undulations, or namely the place comprising the centers of curvature of the undulations.

All the described coolers by direct contact are capable of producing hot water, or even steam, when the oil to be cooled is at a sufficiently high temperature; but in order to obtain steam the feeding of the part of such coolers that produced that steam must be effected with hot water. The adequate process consists in dividing the total cooling into several successive operations, extracting after each partial operation the hot water or the steam produced, and injecting new cooling water. In this manner, the hot water produced in one operation can be used as feeding water of an anterior operation, and may be injected in the tube at the beginning of said anterior operation.

Other modifications embodying the present invention are shown in Figs. 4 to 7 inclusive, which are described in greater detail as to construction and operation in the latter portion of the specification. These modifications, for the purpose of protracting the repeated contact of the two fluids and to prolong the process of interpenetrating flow of the two streams of fluids, are each provided with elongated horizontal portions which consist of relatively narrow tubing having frequent undulations or opposed curvatures as indicated by the reference characters O and O1. From what has already been said in an earlier portion of the specification, it will be understood that when two immiscible fluids having different densities travel through such horizontal tubes having frequent undulations or reversals of curvature at high velocity, the reversal of direction of the centrifugal force to which the streams are subjected will cause the two streams to interpenetrate and displace each other with reference to the center of curvature. Let us assume, for example, that vapor with a quantity of liquid finely entrained through spraying is traveling at high velocity along horizontal tubes shown in Figs. 4 to 7 and that the liquid and the vapor entered the tube at substantially different temperatures. The fine sub-division, of course, affords an opportunity for very extensive surface contact between the particles of liquid and the particles of vapor. As this mixture travels through a portion of the tube whose center of curvature is below the tube in the drawings, the heavy particles would tend to move toward the top of the sheet and displace the lighter particles toward the bottom of the sheet because the centrifugal force in that portion of the tube acts upward. During this relative shifting, each particle of liquid will rub against successive particles of vapor and conversely each particle of vapor will rub against successive particles of liquid. This relative shifting will take place throughout the entire cross-section of the tube so that the conditions are excellent for promoting the equalization of the temperatures of the liquid and the vapor throughout the tube.

Fig. 4 represents the plan of a condensation apparatus made of undulate tubes, in which the heat contained in the petroleum vapors is utilized for the production of hot water. In this apparatus the cooling operation is divided into four fractionatings; the first one, utilizing the water heated in the second cooling extracted at C1 by the pump B, and re-injected at F, receives at A the vapor to be condensed and ends at C, where the hot water available for the purpose to which it is destined is extracted; the second one, beginning at the termination of the first one, utilizes as cooling water the water heated in the third fractionating operation, to secure which the water is extracted at C2 and is re-injected at F1 by the pump B1; the third one, beginning at the termination of the second one, namely right after C1, utilizes as cooling water the water heated in the fourth fractionating operation, to effect which the water is extracted at the end of tube C3 and injected at F2 by the pump B2; finally, the fourth one, beginning at C2, receives cold water at F3.

The rectifying columns disclosed in my patent application Serial No. 153,371, filed July 13, 1937, (U. S. Patent No. 2,182,566, dated Dec. 5, 1939), also offer a new application of the undulate tubes as a means for causing the contact of two non-miscible fluids of different densities circulating together in said tubes.

Fig. 5 represents the plan of a coil spire utilizing the undulate tubes, applicable to the coils of distilling column No. 2 of my aforesaid patent application as shown in Figs. 15 and 16 thereof. This spire is made up of two undulate tubes O and O1 connected to the arched tubes A and A1. The arched tube A unites the undulate tube O with the undulate tube O1, and the arched tube A1 with the undulate tube, which in the next higher or lower spire, occupies the position of tube O. The coil is traversed as has been described in the aforementioned patent application, by the vapor to be rectified, in the direction of the arrows. At I, in the coil, an injection of rectifying liquid in the form of a fine spray containing alcohol is effected. This liquid flows through the coil, finely entrained in the circulating vapor, and the successive undulations of tube O cause the frequent opposed lateral shifting of both fluids, atomization of the liquid by the vapor, and intimate contact of their particles, and, by reason of that intimate contact, interchange of heat and substitution of part of the alcohol which becomes vaporized by an equivalent quantity of steam which becomes condensed, that is, a rectification of that vapor results.

At the end of the tube O, the entrained liquid is separated by the arched tube A, the section of which is of one of the shapes described in the aforesaid patent, it is collected by the small channel which that arched tube offers, and is finally extracted by the tube E which connects with said small channel. The undulate tube O1 and the arched tube A1 together operate in the same way as the arrangement of the tubes O and A, receiving in spray form at I1 the injection of the rectifying liquid which is extracted at E1 after rectification. The vapor emerges at 24 to enter the succeeding higher or lower convolution of the column.

Fig. 6 represents the plan of another spire of a coil of the same type applicable to the rectifying columns of my aforesaid patent application, which differentiates itself from that of Fig. 5 only by a greater extension of the arched tubes A and A1; the arrangement and functioning of the spire corresponding otherwise to that of Fig. 5.

Fig. 7 represents a horizontal section of a floor of a distilling column which can be applied as well to the column No. 3 as to the column No. 4 of my above mentioned patent application.

The vapor to be rectified, coming from the lower floor, enters the floor through the triangle ABC which is open; and penetrates through the vertical section AB into the last outer turn of the new spiral which forms the floor and travels through the whole of that spiral in the direction of the arrow and goes out at S and then passes on to the higher floor, through which it travels in the same way.

The rectifying liquid, coming from the higher floor, is injected at I, atomized and entrained by the stream of the vapor to be rectified, effecting a rectification of that vapor in the undulate tube F1, D1; it is afterwards separated in the arch D1 E1, injected anew at E1 into the next outer spire, atomized again by the circulating fluid at its flowing out at E1 and entrained by that fluid, causing in its course through the undulate tube E1M1 a rectification effect in that fluid, previously to the rectification effected by the same rectifying liquid along the tube ID1 which has been described.

The rectifying liquid goes on being separated in the arch M1F1, to be injected at F1 in the immediately outer spire in relation to the spire of its first injection, ID1, repeating in that spire and in the successive spires from the anterior outwards the same operations; so that the rectifying liquid circulates from the inside outwards through the successive spires, while the vapor to be rectified circulates from the outside inwards along the whole spiral; and in each new spire those fluids are again placed in contact twice in that inverse motion, two new rectifications being thus effected. Finally, the rectifying liquid gathered by the spoon E5 is conveyed and injected into the lower floor in the way described in my aforesaid application. Each new rectification of the vapor is effected with an ever richer rectifying liquid corresponding with a greater purity of that vapor, while the rectifying liquid becomes constantly poorer in its contrary course, and it also rectifies successively ever poorer vapors.

I have described what I believe to be the best embodiments of my invention. I do not wish, however, to be confined to the embodiments shown, but what I desire to cover by Letters Patent is set forth in the appended claims.

I claim:

1. An apparatus for producing intimate contact between two fluids of different densities comprising a tubular structure having alternate curved and undulate sections, and means for extracting fluid from the outer side of a curved section near the delivery end thereof and for re-injecting the extracted fluid at the inner side of the tubing substantially at the intake end of an undulate section.

2. An apparatus for producing intimate contact between two fluids of different densities including means defining a continuous path of generally spiral form comprising alternate curved sections and relatively straight but undulate sections, certain of the curved sections being arranged contiguously one within another, and means affording restricted communication at intervals between the outer side of an inner curved section and the inner side of an outer curved section.

3. The process of obtaining protracted, intimate and repeated contact between the particles of two non-miscible fluids of different densities, which consists in causing the two fluids to travel concurrently along a confined, elongated, curved path at a velocity such that the centrifugal force developed and maintained along said curved path will cause the heavy particles of fluid to travel outwardly relative to center of curvature through the stream of lighter fluid, displacing the particles of lighter fluid to an inner position relative the center of curvature and separating said fluids laterally of said path, then inverting the relative positions of the two fluids with respect to the center of curvature, passing the fluids again along a confined, elongated, curved path at a velocity to cause the inner heavier fluid to pass through the lighter fluid to displace the same and separate the two fluids, inverting the positions of the two fluids, and repeating the process so that the action of the centrifugal force after each inversion causes the mutual penetration and crossing of the fluids.

4. The process of obtaining protracted, intimate and repeated contact between the particles of two non-miscible fluids of different densities as described in claim 3, in which the step of inverting the relative positions of the two fluids is obtained by separately conducting the two fluids through crossing paths and separately delivering the same in inverted relation for the next contacting and separating step.

5. The process of obtaining protracted, intimate and repeated contact between the particles of two non-miscible fluids of different densities, as described in claim 3, in which the inversions of the fluids with respect to the center of curvature of the fluid path are produced by reversing the curvature of the path.

6. An apparatus for obtaining protracted, intimate and repeated contact between two fluids of different densities comprising tubing having a succession of elongated curved portions, means for causing the two fluids to travel concurrently along the tubing at a velocity such that the centrifugal force developed and maintained along said curved portions will cause the denser fluid to travel outwardly relative the center of curvature through the lighter fluid and displace the lighter fluid to an inner position relative the center of curvature, and means interposed between successive curved portions connecting such successive curved portions and inverting the relative positions of the two fluids with respect to the center of curvature.

7. The process of obtaining protracted, intimate and repeated contact between the particles of two non-miscible fluids of different densities, which consists in causing the two fluids to travel concurrently along a confined, elongated, curved path at a velocity such that the centrifugal force developed and maintained along said curved path will cause the heavy particles of fluid to travel outwardly relative to the center of curvature through the stream of lighter fluid, displacing the particles of lighter fluid to an inner position relative to the center of curvature, then inverting the relative positions of the two fluids with respect to the center of curvature, passing the fluids again along a confined, elongated, curved path at a velocity to cause inner heavier fluid to pass through the lighter fluid to displace the same as before, again inverting the positions of the two fluids, and repeating the process so that the action of the centrifugal force after each inversion causes the mutual penetration and crossing of the fluids.

8. The process of obtaining protracted, intimate and repeated contact between the particles of two non-miscible fluids of different densities, which consists in causing the two fluids to travel concurrently along a confined, elongated, curved path at a velocity such that the centrifugal force developed and maintained along said curved path will cause the heavy particles of fluid to travel outwardly relative to the center of curvature through the stream of lighter fluid, displacing the particles of lighter fluid to an inner position relative the center of curvature, passing the fluids again along a confined, elongated, curved path of a curvature opposed to the curvature of the first mentioned curved path at a velocity to cause the inner heavier fluid to pass through the lighter fluid to displace the same as before, and repeating the process so that the action of the centrifugal force repeatedly causes the mutual penetration and crossing of the fluids.

JEAN LOUMIET ET LAVIGNE.